US012731456B2

(12) United States Patent
Coppert

(10) Patent No.: US 12,731,456 B2
(45) Date of Patent: Sep. 8, 2026

(54) GAMING MACHINE ASSEMBLY

(71) Applicant: Bluberi Gaming USA, Inc., Las Vegas, NV (US)

(72) Inventor: Michael Coppert, Las Vegas, NV (US)

(73) Assignee: Bluberi Gaming USA, Inc., Las Vegas, NV (US)

( * ) Notice: Subject to any disclaimer, the term of this patent is extended or adjusted under 35 U.S.C. 154(b) by 163 days.

(21) Appl. No.: 18/823,070

(22) Filed: Sep. 3, 2024

(65) Prior Publication Data

US 2025/0239130 A1 Jul. 24, 2025

Related U.S. Application Data

(60) Provisional application No. 63/624,232, filed on Jan. 23, 2024.

(51) Int. Cl.
*G07F 17/32* (2006.01)

(52) U.S. Cl.
CPC ...... *G07F 17/3216* (2013.01); *G07F 17/3211* (2013.01); *G07F 17/323* (2013.01)

(58) Field of Classification Search
CPC . G07F 17/3211; G07F 17/3216; G07F 17/323
See application file for complete search history.

(56) References Cited

U.S. PATENT DOCUMENTS

2003/0164431 A1* 9/2003 Kanashiki ............ F16M 13/027 248/157
2006/0287048 A1* 12/2006 Seelig ................. G07F 17/3211 463/16
2008/0032780 A1* 2/2008 Seelig ..................... G07F 17/34 463/31
2010/0087249 A1* 4/2010 Rowe .................. G07F 17/3211 463/31
2010/0116951 A1* 5/2010 Bifulco ............... G09F 15/0056 248/161
2020/0111290 A1* 4/2020 Winston .................. G07F 17/34

* cited by examiner

*Primary Examiner* — Jason T Yen
(74) *Attorney, Agent, or Firm* — Dickinson Wright PLLC

(57) ABSTRACT

A gaming machine assembly includes a base assembly that is positioned about an axis for contacting the ground. A pole is connected to the base assembly and extends upwardly along the axis between a bottom region and a top region. The pole is configured to be located centrally relative to a plurality of gaming machines. A sign assembly is moveably coupled to the pole and is axially slideable along the pole. The sign assembly is configured to be positioned in an elevated position axially along the top region of the pole above the plurality of gaming machines. A lifting assembly is configured to move the sign assembly axially upwardly along the pole to the elevated position.

20 Claims, 10 Drawing Sheets

FIG. 11A
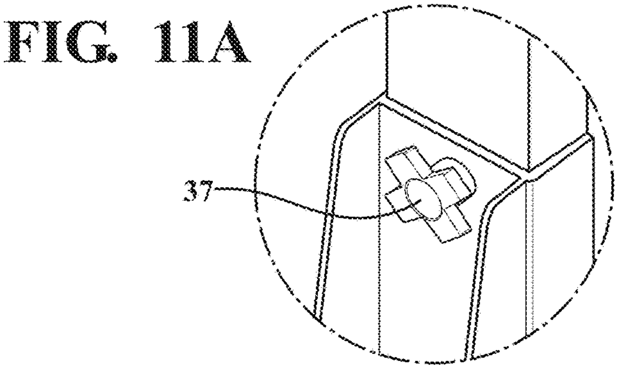
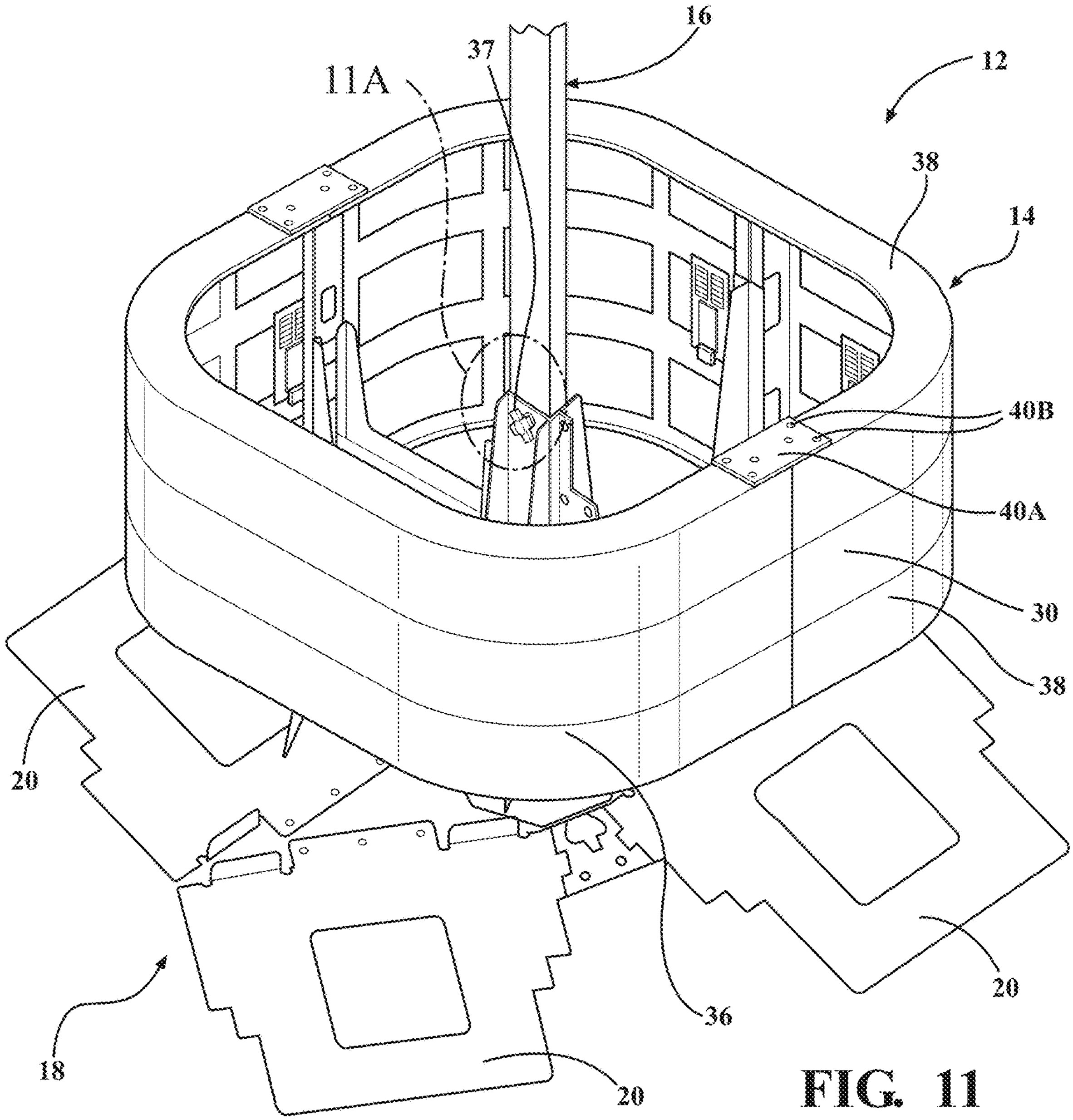
FIG. 11

GAMING MACHINE ASSEMBLY

CROSS-REFERENCE TO RELATED APPLICATIONS

This utility patent application claims the benefit of and priority to U.S. provisional patent application Ser. No. 63/624,232, filed on Jan. 23, 2024, the entire disclosure of which is hereby incorporated by reference in their entireties.

FIELD

The present disclosure relates to gaming machines, such as those used to play games of chance in casinos or the like.

BACKGROUND

This section of the written disclosure provides background information related to gaming machine assemblies and associated methods of assembling the same, and is not necessarily prior art to the inventive concepts disclosed and claimed in this application.

Gaming machines, such as slot machines and the like, are known for providing entertainment to patrons of gaming establishments like casinos. It is common for gaming machines to have signs or other displays positioned above the machine to serve as an advertisement for the associated game, or for presenting information on other aspects of the establishment. In one particular example, a group of slot machines or other analog, digital, video-based, or other entertainment or gaming machines may have an electronic display sign mounted above the group of machines to create an appealing and/or attention-grabbing visual effect for the group of machines. Mounting such display signs can be a time-consuming and physically demanding task, conventionally requiring multiple technicians hoisting heavy components by hand on ladders, or using bulky and expensive hoist equipment.

SUMMARY

This section provides a general summary of the inventive concepts associated with this disclosure and is not intended to be interpreted as a complete and comprehensive listing of all of its aspects, objectives, features and advantages.

According to an aspect of the disclosure, a gaming machine assembly includes a base assembly that is positioned about an axis for contacting the ground. A pole is connected to the base assembly and extends upwardly along the axis between a bottom region and a top region. The pole is configured to be located centrally relative to a plurality of gaming machines. A sign assembly is moveably coupled to the pole and is axially slideable along the pole. The sign assembly is configured to be positioned in an elevated position axially along the top region of the pole above the plurality of gaming machines. A lifting assembly is configured to move the sign assembly axially upwardly along the pole to the elevated position.

According to another aspect of the disclosure, a method of assembling a gaming machine assembly includes providing a base assembly positioned about an axis for contacting the ground. The method also includes connecting a pole to the base assembly. The pole extends upwardly along the axis between a bottom region and a top region. The method also includes positioning a sign assembly about the pole. The method also includes moving the sign assembly axially upwardly along the pole to an elevated position adjacent to the top region of the pole.

BRIEF DESCRIPTION OF DRAWINGS

The drawings described herein are for illustrative purposes only of selected embodiments and not all possible implementations and are not intended to limit the scope of the present disclosure.

FIG. 11 is a perspective view of the sign assembly in the first position, illustrating a bolt and associated bolt and knob for temporarily holding a half of the sign assembly in place; and FIG. 12 is a flow diagram illustrating a method for assembling the.

DETAILED DESCRIPTION

Figure 1A:
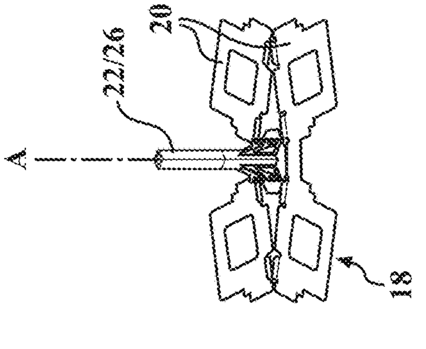
FIG. 1A is perspective view of a base assembly of an embodiment of a gaming machine assembly, according to an aspect of the disclosure.
Figure 1B:
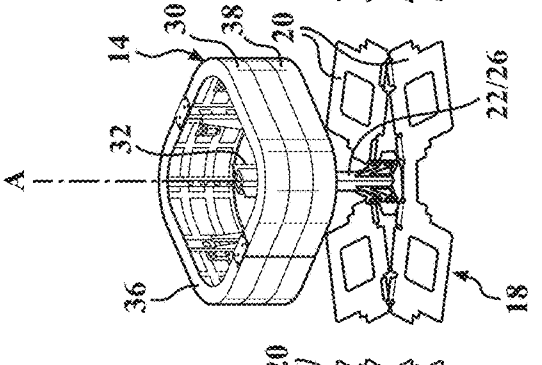
FIG. 1B is perspective view of a sign assembly connected to a lower pole of the base assembly of FIG. 1A.
Figure 1C:
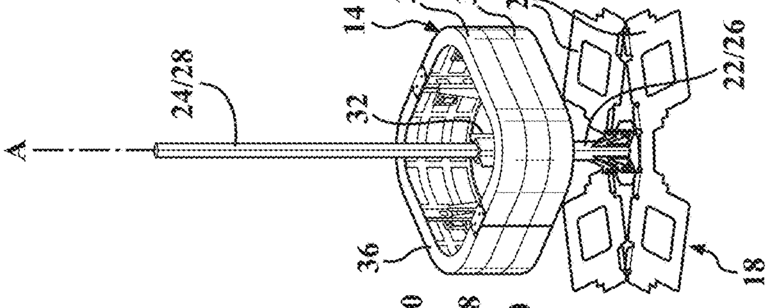
FIG. 1C is a perspective view of an upper pole secured to the lower pole of FIG. 1B.
Figure 1D:
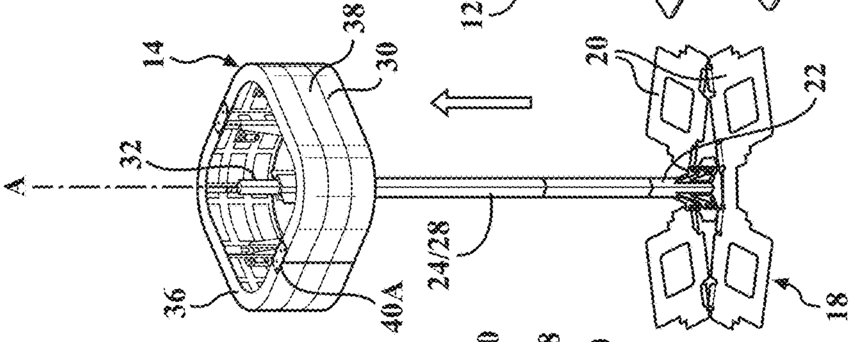
FIG. 1D is a perspective view of the sign assembly moving up the pole to an elevated position.
Figure 1E:
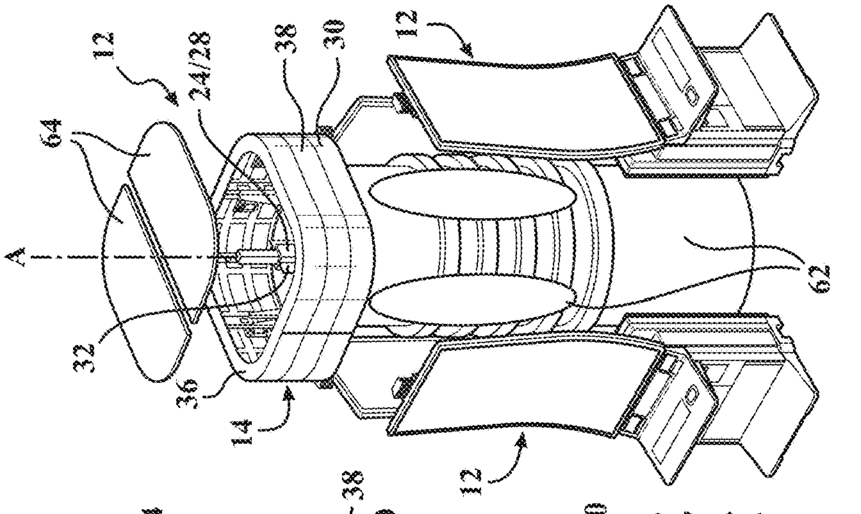
FIG. 1E is a perspective view of a complete gaming machine assembly with the sign assembly in the elevated position.

Referring to the figures, wherein like numerals indicate corresponding parts throughout the several views, a gaming machine assembly 10 is provided. The gaming machine assembly 10 may be configured to support and display a series of gaming kiosks 12. The gaming kiosks 12 may be configured to present various types of games, such as casino-style games of chance. As generally shown in FIG. 1E, once the gaming machine assembly 10 is assembled, the gaming kiosks 12 are arranged circumferentially around a central vertical axis A. A display sign assembly 14 is positioned axially above the gaming kiosks 12 in an elevated position for displaying information to patrons, e.g., a name of the game played on the gaming kiosks 12, and/or a jackpot amount associated with the gaming kiosks 12. Display signs can be relatively heavy, weighing up to 50, 80 or 100 pounds or more. Accordingly, the gaming machine assembly 10 has a lifting assembly 42 which is configured to conveniently/easily lift the display sign assembly 14 along a central pole 16 along the axis A into the elevated position. Advantageously, in some embodiments, the lifting assembly 42 and methods disclosed herein can be highly portable and relatively lightweight, such that one to two people can carry a full installation kit for the gaming machine assembly 10.

As best shown in FIGS. 1A-1D, the gaming machine assembly includes a base assembly 18 for contacting the ground. The base assembly 18 includes a series of feet 20 that overlie the ground for supporting the gaming machine assembly 10 in an upright position. The feet 20 are arranged in circumferentially spaced relationship with one another about the center axis A. According to the disclosed embodiment, four feet 20 are used, and each of the feet 20 generally has a square shape. Other numbers of feet 20 may be used, and they may have various shapes and sizes. As shown in FIG. 1E, once assembled, the gaming kiosks 12 are positioned on top of the feet 20 and positioned circumferentially around the axis A. The base assembly 18 may be of an aluminum material and have a weight of less than 10 pounds, e.g., four pounds.

Figure 2:
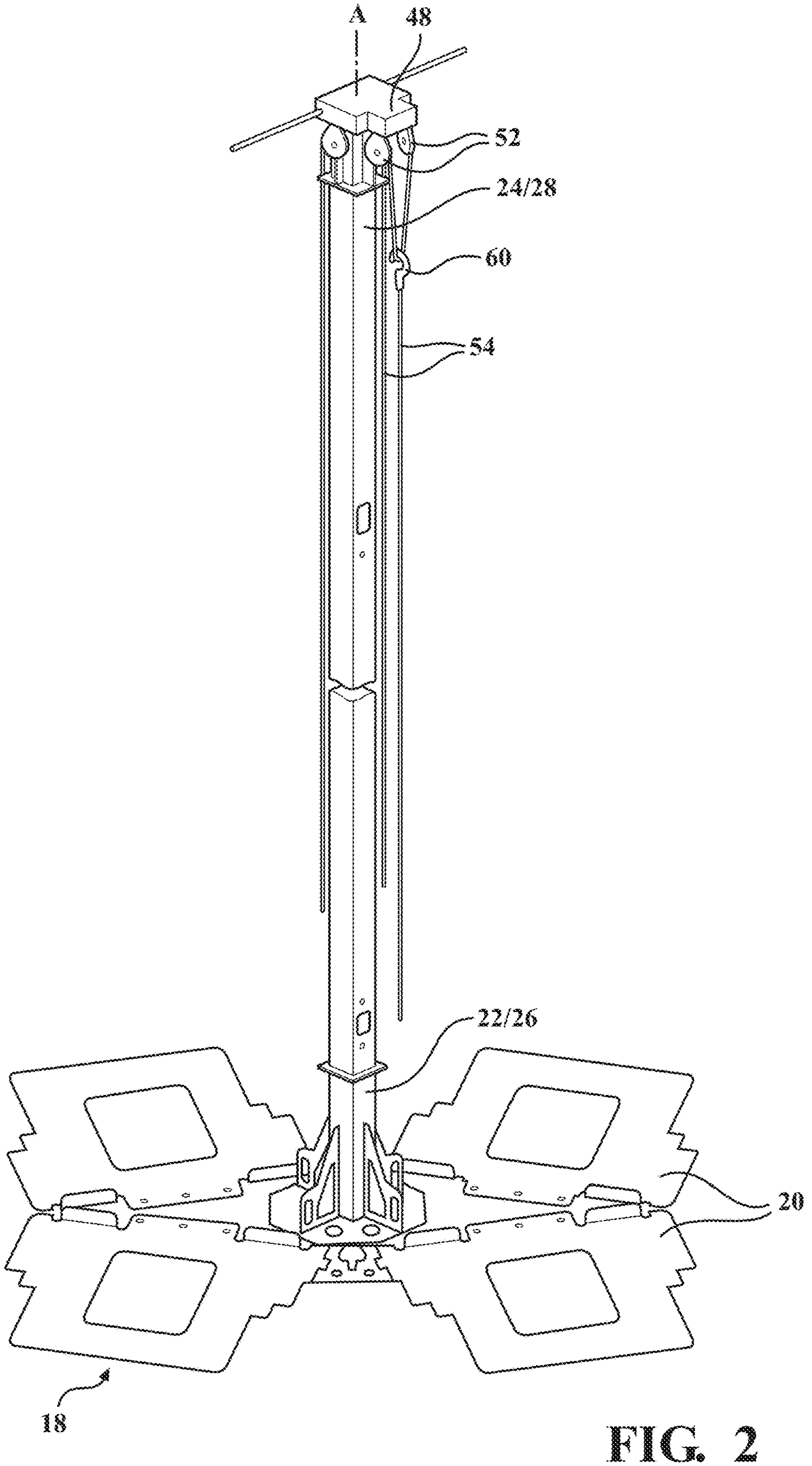
FIG. 2 is a perspective view of a base assembly, pole and pulley assembly and associated cables of the gaming machine assembly.

The pole 16 is positioned along the axis A centrally to the feet 20 and is coupled to the feet 20. The pole 16 extends axially between a bottom region 22 and a top region 24. As illustrated in FIG. 2, according to the disclosed embodiment, the pole 16 is comprised of a lower pole segment 26 and an upper pole segment 28 that are connectable to one another in the axial direction. Furthermore, the pole 16 has a square-shaped cross-section, but other shapes may be used. According to other embodiments, the pole 16 may be comprised of a single long segment instead of two segments 26, 28.

Figure 3:
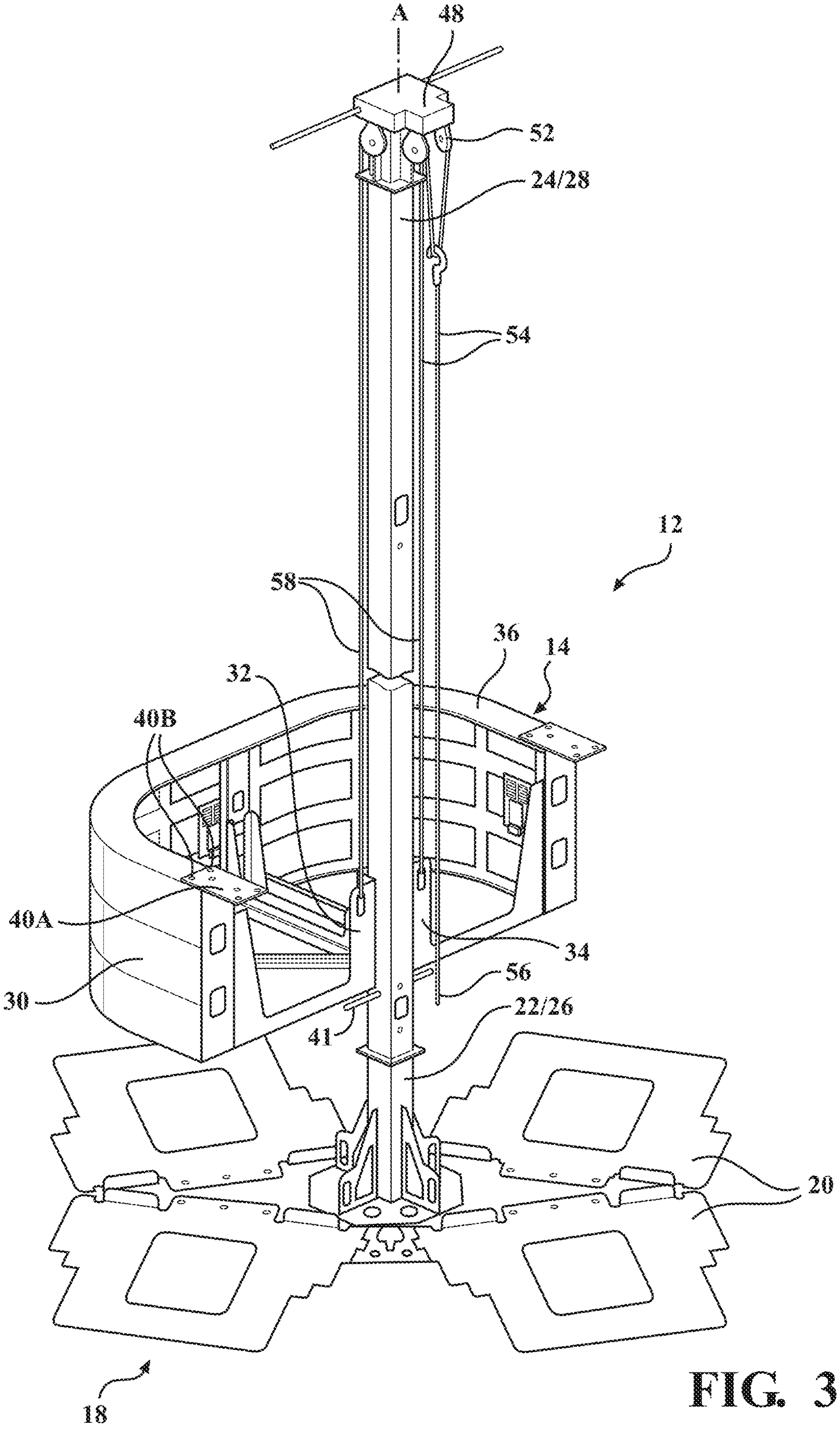
FIG. 3 is a perspective view of the sign assembly in a first position prior to being elevated.
Figure 5:
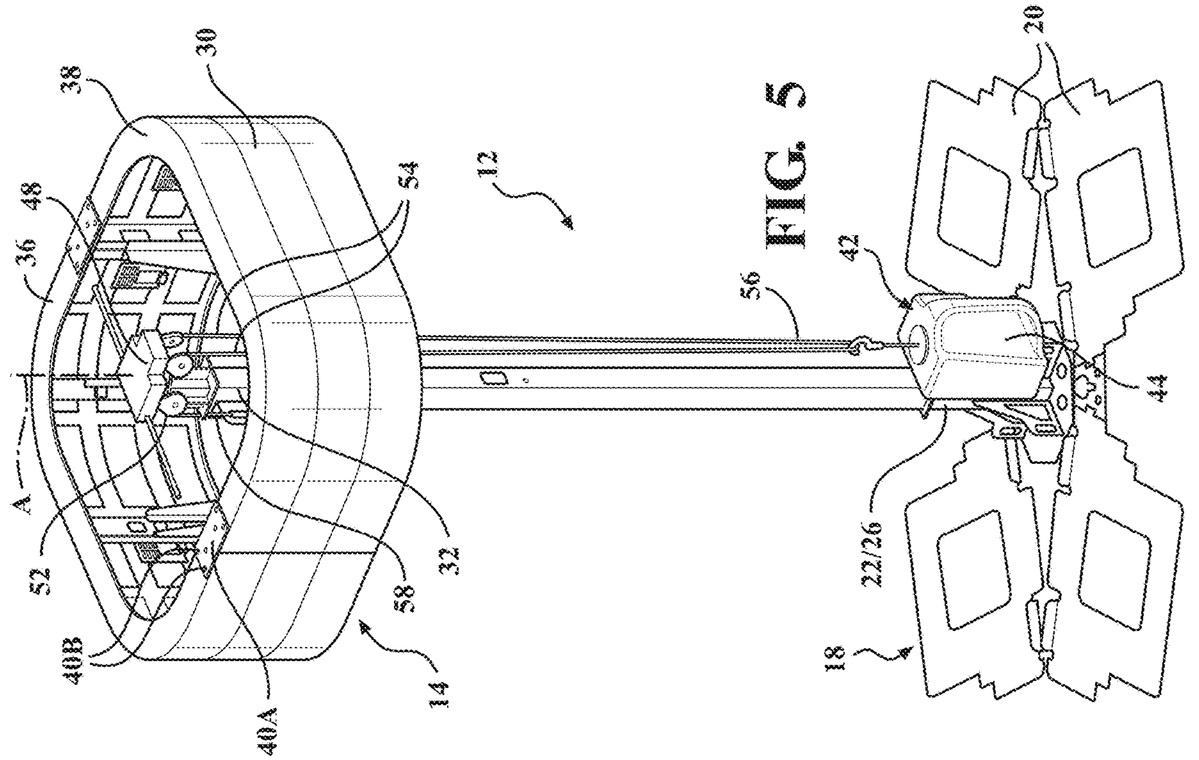
FIG. 5 is a perspective view of the sign assembly in the elevated position.
Figure 4:
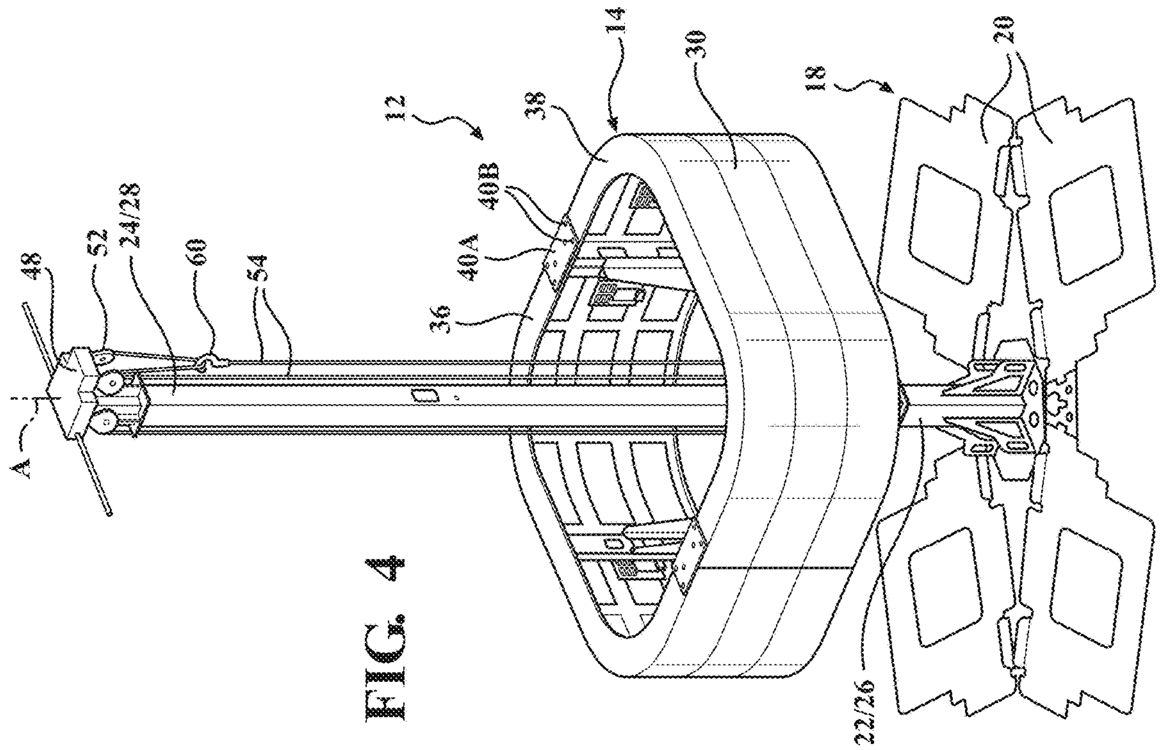
FIG. 4 is a perspective view of the sign assembly in the first position prior to being elevated.
Figure 6:
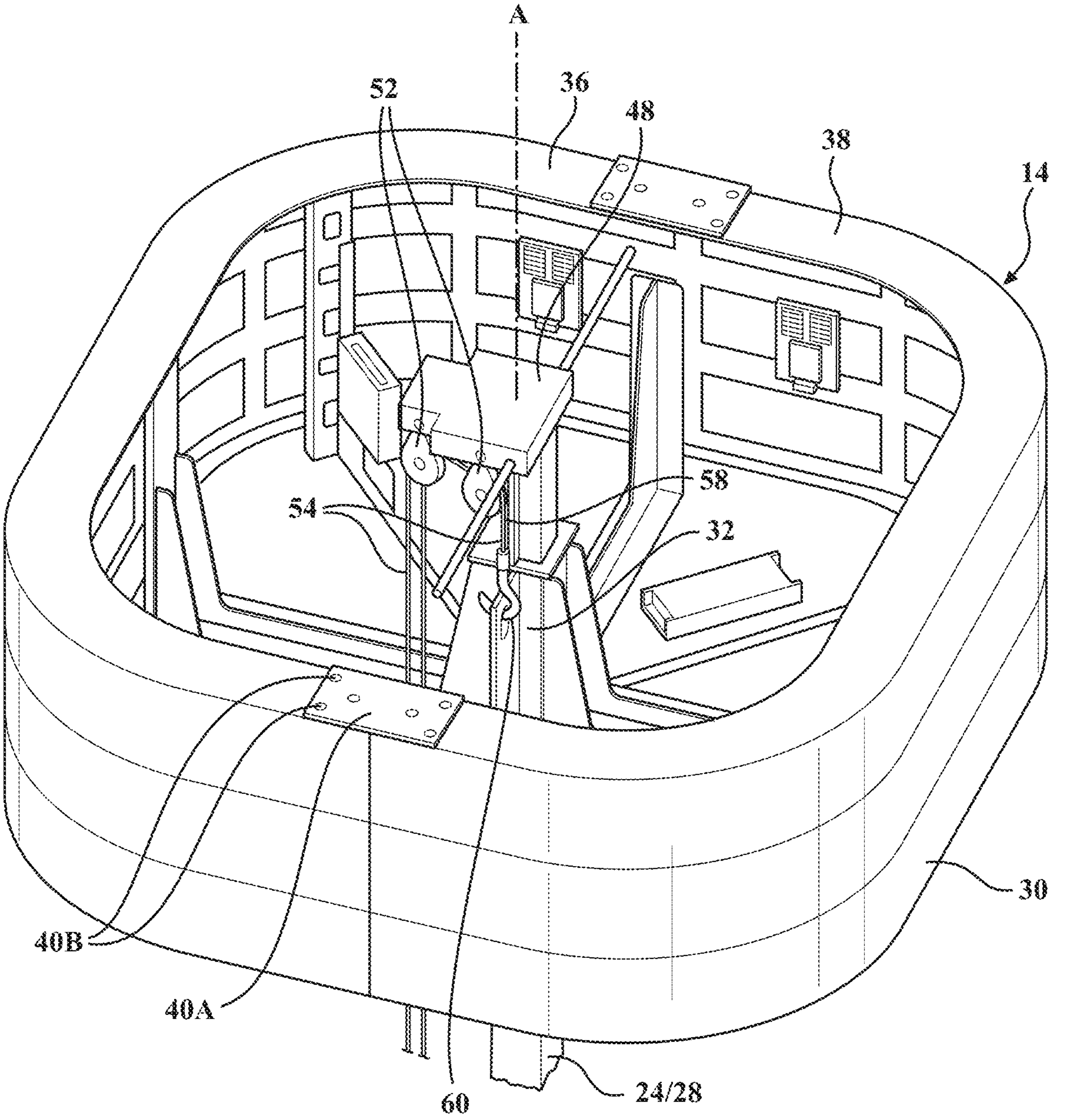
FIG. 6 is a perspective view of the sign assembly.

As shown in FIG. 4-5, the sign assembly 14 is slideably connected to the pole 16 such that the sign assembly 14 can be moved axially along the pole 16. The sign assembly 14 has a display portion 30 that has a generally square-shaped perimeter which spans 360 degrees around the pole 16, and a receiving portion 32 that is located centrally relative to the display portion 30. The display portion 30 may have an electronic display screen, e.g., one or more LED monitors, to display information selected by the operator. The display portion 30 may alternatively have fixed graphics. As best shown in FIG. 3, the receiving portion 32 defines a channel 34 which slideably receives the pole 16 to permit the sign assembly 14 to be axially slid along the pole 16. The channel 34 has a cross-sectional shape which matches that of the pole 16 to permit the sign assembly to be slide along the pole. According to the described embodiment, the channel 34 and pole 16 each have a square-shaped cross-section to provide the connected, sliding arrangement.

As shown in FIG. 3-6, the sign assembly 14 may be comprised of a first half 36 and a second half 38 which are separable from one another along a plane which extends through the axis A. The first and second halves 36, 38 may initially be separate from one another, and positioned about the pole 16 prior to being connected to one another in order to provide a simple manner of connecting the sign assembly 14 to the pole 16. An arrangement of connectors 40A, 40B are configured to connect the first and second halves 36, 38 to one another once the sign assembly 14 is positioned about the pole 16. According to the disclosed embodiment, the connectors 40A, 40B include a series of flanges 40A and associated bolts 40B. The two halves 36, 38 may be initially, or finally secured using a temporary connector, such as a knob, and then secured to one another via screws, plates, or other permanent coupling devices. More particularly, as shown in FIGS. 11-11A, a bolt with an associated rotatable knob 37 may be inserted through the receiving portion 32 of one of the halves 36, 38 and the pole 16. Other types of connectors may be used. As shown in FIG. 3, a lower pin 41, e.g., a cotter pin 41, may initially extend through the lower pole segment 26 and the pole 26, 28 to fix the sign assembly 14 at an initial axial height. The bolt and knob 37 may also be used for this purpose.

Figure 9:
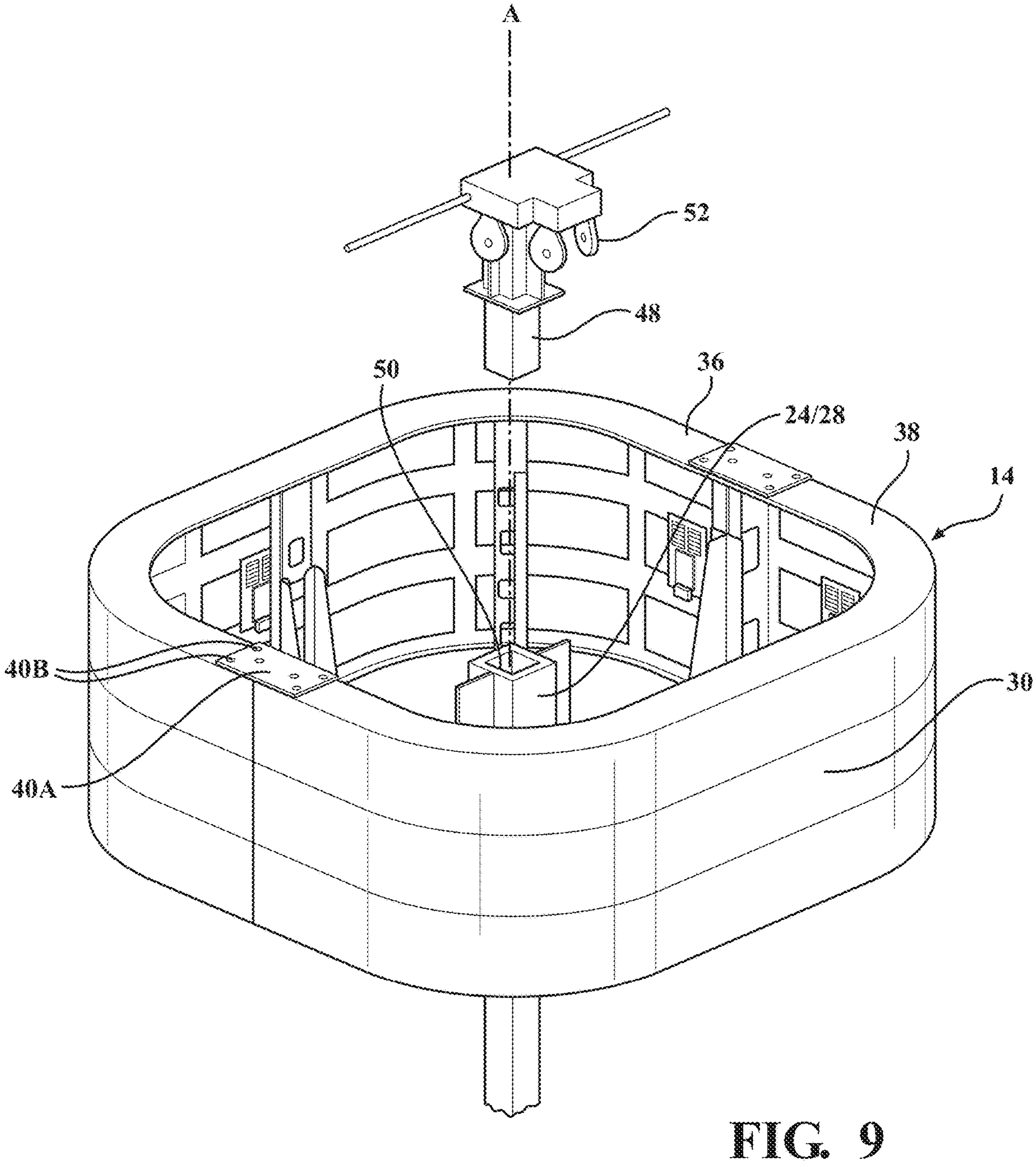
FIG. 9 is a perspective view illustrating a pulley frame connecting to the pole.
Figure 10:
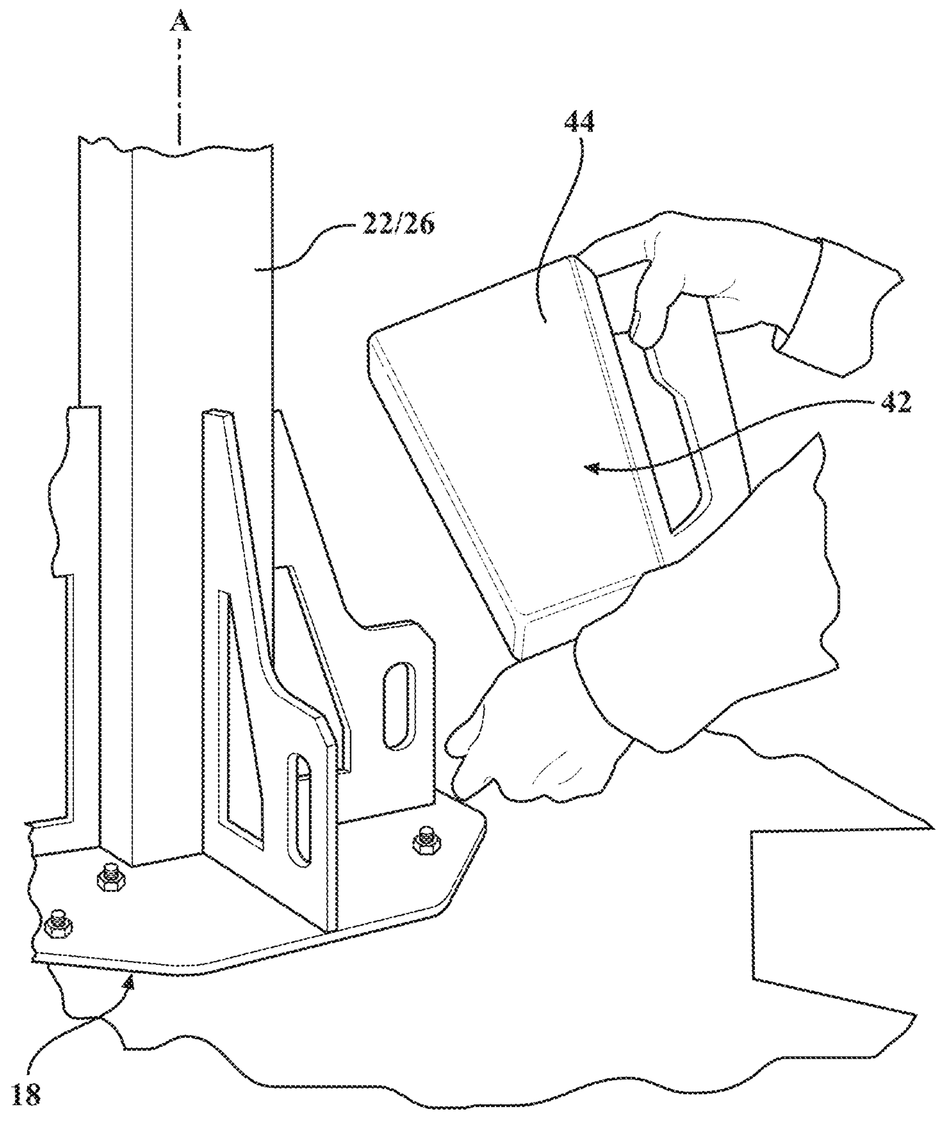
FIG. 10 is a perspective view illustrating installing a winch to the base assembly.
Figure 12:
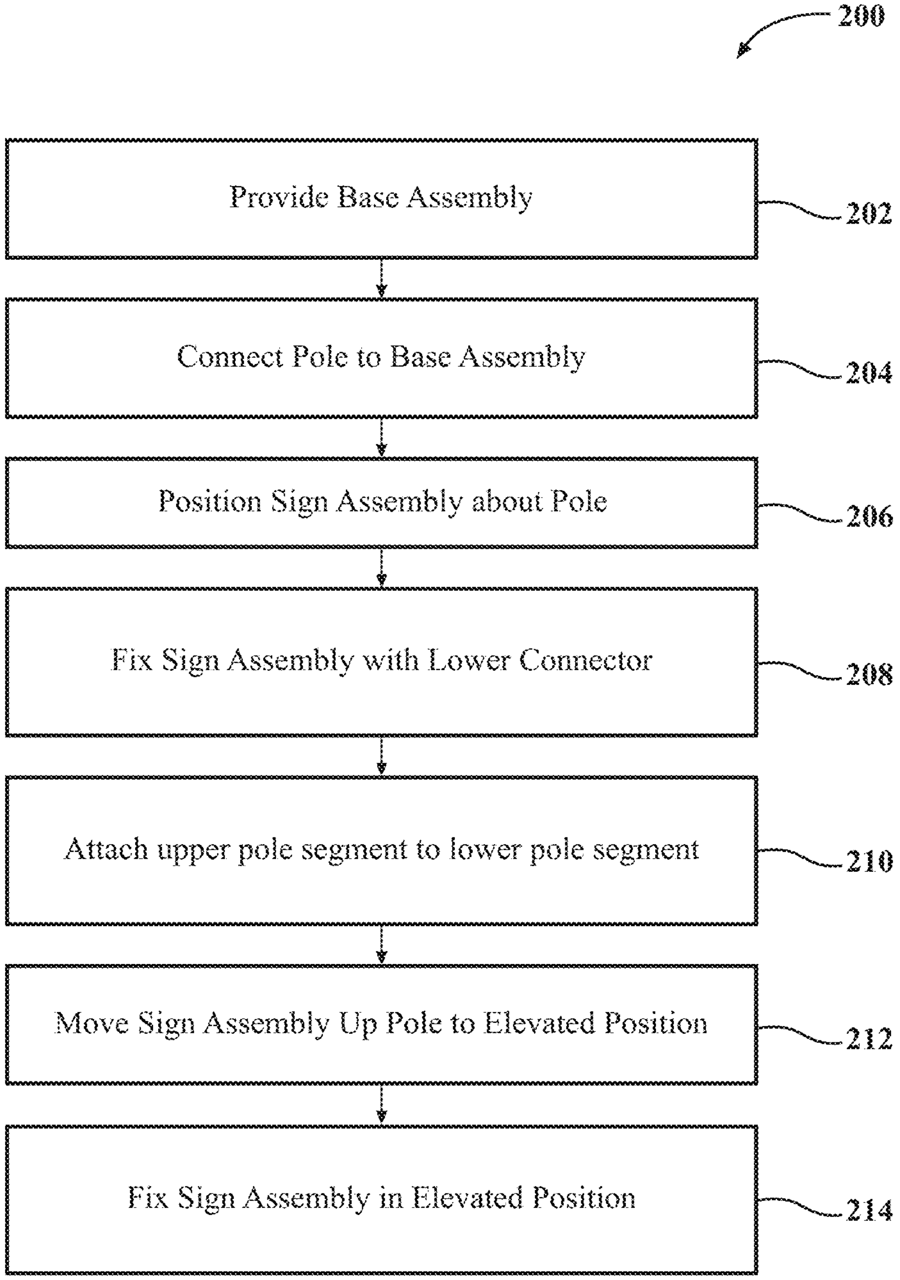

A lifting assembly 42 is configured to draw the sign assembly 14 axially upwardly along the pole 16 in order to position the sign assembly 16 in the elevated position above the gaming machines 12. As shown in FIG. 5, the lifting assembly 42 may include a winch 44, manual crank, or the like, which is positioned adjacent to the base assembly 18. As illustrated in FIG. 10, the winch 44 can be a portable winch having a weight of less than 25 pounds, for example. The lifting assembly 42 also includes a pulley mechanism 46 which is connectable to the top region of the pole 16. More particularly, as best shown in FIG. 9, the pulley mechanism 46 includes a pulley frame 48 which is insertable into a passage 50 at the top of the pole 16. The pulley mechanism 46 also includes an arrangement of pulleys 52 that are connected to the pulley frame 48. As shown in FIGS. 4-5, the lifting assembly 42 also includes one or more cables 54 that are connected to the winch 44 at a first end 56, wrapped around the pulleys 52, and connected to the sign assembly 14 at a second end 58. Accordingly, downward movement of the cables 54 toward the winch 44 causes vertical/upward movement of the sign assembly 14. The pulley mechanism 46 may be a relatively portable device having a weight of less than 25 pounds, e.g., 15 pounds. A hook 60 may be positioned at one or more of the first and second ends 56, 58 of the cables 54 to simplify the connection of the cables 54 to the winch 44 and/or sign assembly 14. During use, the lifting assembly 42 provides precise control over vertical movement of the sign assembly 14.

As shown in FIG. 1E, once assembled, the sign assembly 14 is located in the elevated position in which it is positioned above the gaming kiosks 12. A plurality of intermediate components 62 may be located around the pole 16 and between the gaming kiosks 12. Similar to the sign assembly 14, the intermediate components 62 may present graphics associated with the games of the gaming kiosks. A cover 64 comprised of one or more panels may also be positioned on top of the sign assembly 14 for closing off a top of the sign assembly 14. The intermediate components 62 may include, but are not limited to, a wedge, curtains, glass components, mirrors or the like.

As set forth in FIG. 11, a method 200 of assembling the gaming machine assembly 10 is also provided. The method first includes 202 providing a base assembly 18. The method also includes 204 connecting a pole 16 to the base assembly 18. Connecting the pole 16 to the base assembly 18 may initially include connecting a lower pole segment 26 to the base assembly 18. The lower pole segment 26 may be at a first height approximately two to five feet above ground level, making it approximately at or below a human waist or desktop height.

The method continues with 206 positioning a sign assembly 14 about the pole 16. As shown in FIG. 1B, this may include connecting the sign assembly 14 about the lower pole segment 26 alone. According embodiments, the top of the installed sign assembly 14 is located approximately 40" from ground level at the first height. The first height may be selected so as to permit easy access and assembly by one or more technicians at a height which does not require standing on a ladder, stool or other elevated platform. As previously noted, the sign assembly 14 may be comprised of first and second halves 36, 38 which are positioned about the pole 16, thus the method may also include drawing the first and second halves 36, 38 toward one another and securing the first and second halves 36, 38 to form the complete sign assembly 14. In other embodiments, the sign may be pre-assembled and then placed over the lower pole segment 26. It should be appreciated that connecting the sign assembly 14 to the lower pole segment 26 alone initially, prior to connecting the upper pole segment 28, provides a simple arrangement to connect the sign assembly 14. The method may continue with 208 fixing the sign assembly 14 with a lower connector 41 such as a cotter pin 41. The lower connector 41 may be used temporarily until the sign assembly 14 is ready to be raised into its elevated position. The method continues with 210 attaching the upper pole segment 28 to the lower pole segment 26.

Figure 8:
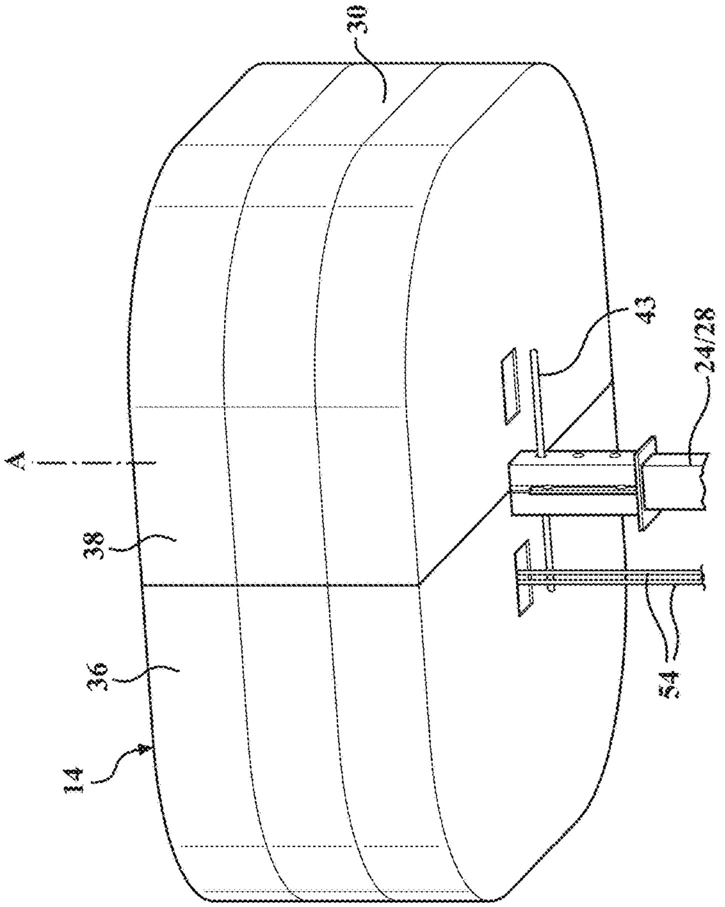
FIG. 8 is a perspective view of the sign assembly.
Figure 7:
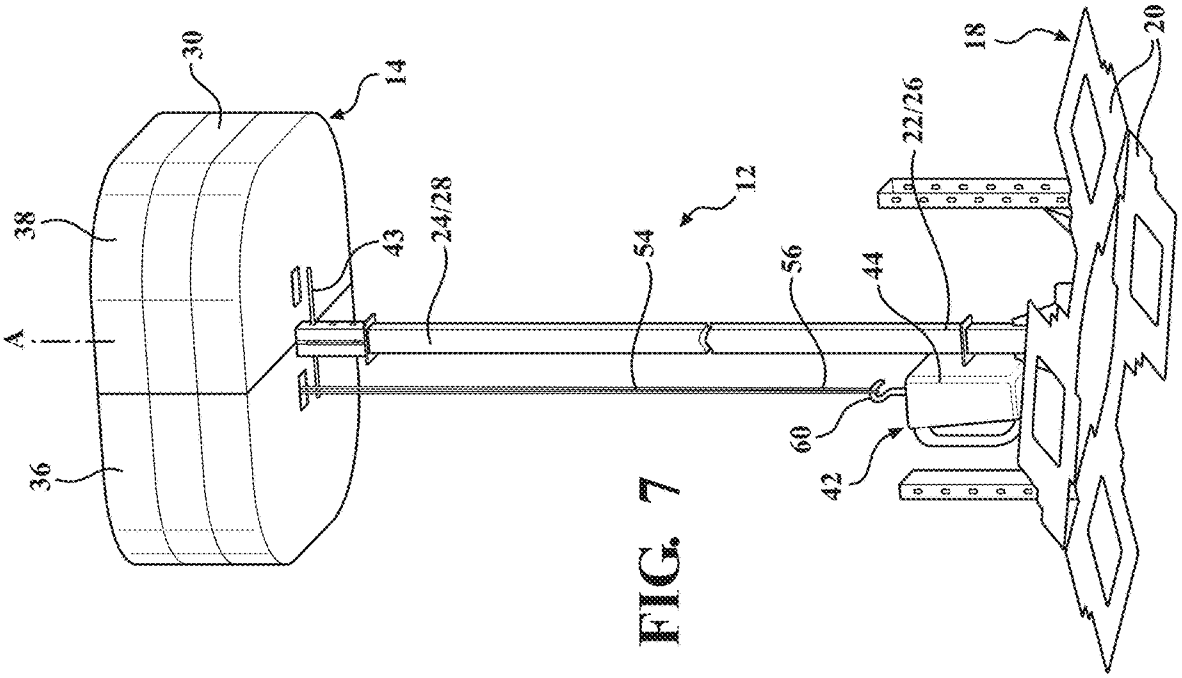
FIG. 7 is a perspective view of the sign assembly in the elevated position.

The method continues with 212 moving the sign assembly 14 axially upwardly along the pole 16 to the elevated position adjacent to the top region 24 of the pole 16. Moving the sign assembly 14 to the elevated position includes moving the sign assembly 14 with a lifting assembly 42 such as a winch 44. The method continues with 214 fixing the sign assembly 14 to the pole 16 in the elevated position. Fixing the sign assembly 14 may initially include using a temporary upper connector, which may be installed through the receiving portion 32 of the sign assembly 14 and through the pole 16 so as to lock the sign assembly 14 in place at the elevated position to prevent downward movement when the winch 44 and/or cables 54 are removed. In some embodiments, like the lower connector 41, the temporary upper connector may be a temporary component intended to be removed upon completion of assembly 20. Enhanced safety is provided, as the temporary upper connector can be easily inserted by a technician on a ladder positioned adjacent to the sign assembly 14, without having to stand under the sign assembly 14 for any significant period of time. In one example, the temporary upper connector is a 0.5" diameter steel rod that has a length such as one foot, two feet or more, to facilitate fast and reliable insertion. In addition, or alternatively, fixing the sign assembly 14 may include installing a permanent upper connector 43, such as a cotter pin 43, through the pole 16 below the receiving portion 32 of the sign assembly 14, thereby supporting the weight of the sign assembly 14 from below. This is shown in FIGS. 7-8. The permanent upper connector 43 may be configured to lock in place, and can be installed carefully while the temporary upper connector is in place as a safety measure. Once the permanent upper connector 43 is in place, the temporary upper connector 43 and lifting assembly 42 may be removed.

Following removal of the lifting assembly 42, cover components 64 of the sign assembly 14 as well as the associated gaming kiosk, and other auxiliary components/intermediate components 62 can be installed.

In some embodiments, an installation kit is provided. The installation kit may include the lifting assembly 42 and connectors 41, 43 as described above. The installation kit may further include some or all of the sign support components, such as the pole 16. The installation kit may further include one or more additional cables, tools, or other implements as needed for assembling and lifting the sign assembly 14. In some embodiment, the installation kit, excluding the sign itself, can be a relatively portable kit being adapted to fit within a standard duffel bag and having a weight less than 100 pounds, for example, approximately 55 pounds, which can be carried by an individual person.

The subject system and methods may be implemented with minimal modifications to existing display sign support structures. For example, modifying a sign base structure to allow free movement of a rectangular pole therethrough and modifying a pole to have a two-piece locking configuration may be simple modifications that does not require extensive redesign or re-tooling to implement.

Implementations disclosed herein provide systems, methods, and devices for assembling elevated components of gaming machine installations such as display signs. It will be appreciated that the systems and methods described herein are not limited to the context of gaming machines. Rather, the systems and methods described herein may be used for a wide variety of implementations and are not intended to be limited by the examples disclosed herein.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

Obviously, many modifications and variations of the present invention are possible in light of the above teachings and may be practiced otherwise than as specifically described while within the scope of the appended claims. Individual elements or features of a particular embodiment are generally not limited to that particular embodiment, but, where applicable, are interchangeable and can be used in a selected embodiment, even if not specifically shown or described.

What is claimed is:

1. A gaming machine assembly, comprising:
- a base assembly positioned about an axis for contacting the ground;
- a pole connected to the base assembly and extending upwardly along the axis between a bottom region and a top region, the pole configured to be located centrally relative to a plurality of gaming machines;
- a sign assembly moveably coupled to the pole and axially slideable along the pole, the sign assembly configured to be positioned in an elevated position axially along the top region of the pole above the plurality of gaming machines; and
- a lifting assembly configured to move the sign assembly axially upwardly along the pole to the elevated position.

2. The gaming machine assembly as set forth in claim 1 further including a connector configured to fix the sign assembly relative to the pole in the elevated position.

3. The gaming machine assembly as set forth in claim 2, wherein the connector includes at least one pin extending through the pole beneath the sign assembly.

4. The gaming machine assembly as set forth in claim 1, wherein the lifting assembly includes a winch.

5. The gaming machine assembly as set forth in claim 4, wherein the lifting assembly further includes including at least one cable connected to the sign assembly and the winch and configured to be moved by the winch.

6. The gaming machine assembly as set forth in claim 5, wherein the lifting assembly further includes at least one pulley located adjacent to the top region of the pole, and wherein the at least one cable is wrapped about the at least one pulley to facilitate vertical movement of the sign assembly via actuation of the winch.

7. The gaming machine assembly as set forth in claim 6, wherein the winch is located adjacent to the base assembly.

8. The gaming machine assembly as set forth in claim 1, wherein the pole has a square-shaped cross-section.

9. The gaming machine assembly as set forth in claim 1, wherein the sign assembly has a display portion extending annularly about the pole, and a receiving portion central to the display portion and defining a channel slideably receiving the pole to facilitate the movement of the sign assembly.

10. The gaming machine assembly as set forth in claim 9, wherein the channel of the display portion and the pole have substantially the same cross-sectional shape.

11. A method of assembling a gaming machine assembly, comprising:

providing a base assembly positioned about an axis for contacting the ground;

connecting a pole to the base assembly, the pole extending upwardly along the axis between a bottom region and a top region, the pole located centrally relative to a plurality of gaming machines;

positioning a sign assembly about the pole; and moving the sign assembly axially upwardly along the pole to an elevated position adjacent to the top region of the pole axially above the plurality of gaming machines.

12. The method as set forth in claim 11, further including fixing the sign assembly to the pole in the elevated position.

13. The method as set forth in claim 12, wherein fixing the sign assembly includes inserting an upper connector through the pole.

14. The method as set forth in claim 11, wherein moving the sign assembly to an elevated position includes moving the sign assembly with a winch.

15. The method as set forth in claim 11, wherein the pole includes a lower pole segment and an upper pole segment, and wherein the step of connecting the pole to the base assembly includes connecting the lower pole segment to the base assembly prior to positioning the sign assembly about the pole, and wherein the step of positioning the sign assembly about the pole includes positioning the sign assembly about the lower pole segment.

16. A method of assembling a gaming machine assembly comprising:

providing a base assembly positioned about an axis for contacting the ground;

connecting a pole to the base assembly, the pole extending upwardly along the axis between a bottom region and a top region;

positioning a sign assembly about the pole;

moving the sign assembly axially upwardly along the pole to an elevated position adjacent to the top region of the pole;

wherein the pole includes a lower pole segment and an upper pole segment, and wherein the step of connecting the pole to the base assembly includes connecting the lower pole segment to the base assembly prior to positioning the sign assembly about the pole, and wherein the step of positioning the sign assembly about the pole includes positioning the sign assembly about the lower pole segment;

coupling the upper pole segment to the lower pole segment after positioning the sign assembly about the lower pole segment, and wherein the step of moving the sign assembly axially upwardly along the pole to the elevated position includes moving the sign assembly axially upwardly along the lower pole segment and the upper pole segment to the elevated position.

17. The method as set forth in claim 16, further including fixing the sign assembly to the upper pole segment in the elevated position after moving the sign assembly axially upwardly along the lower and upper pole segments.

18. The method as set forth in claim 17, wherein fixing the sign assembly to the upper pole segment in the elevated position includes first fixing the sign assembly with a temporary upper connector, removing a lifting assembly, installing a permanent upper connector, and removing the temporary upper connector.

19. The method as set forth in claim 11, wherein prior to moving the sign assembly axially upwardly, the method includes fixing the sign assembly to the pole with a temporary lower connector.

20. A method of assembling a gaming machine assembly, comprising:

providing a base assembly positioned about an axis for contacting the ground;

connecting a pole to the base assembly, the pole extending upwardly along the axis between a bottom region and a top region;

positioning a sign assembly about the pole;

moving the sign assembly axially upwardly along the pole to an elevated position adjacent to the top region of the pole;

wherein prior to moving the sign assembly axially upwardly, the method includes fixing the sign assembly to the pole with a temporary lower connector; and removing the temporary lower connector after moving the sign assembly to the elevated position.

* * * * *